March 4, 1969 W. E. ENGELHARD 3,430,856
HEAT CONTROL APPARATUS
Filed April 4, 1967

INVENTOR
W. E. ENGELHARD
BY
ATTORNEY

United States Patent Office 3,430,856
Patented Mar. 4, 1969

3,430,856
HEAT CONTROL APPARATUS
William E. Engelhard, Apalachin, N.Y., assignor to
Pyro-Serv Instruments, Inc., North Arlington, N.J.,
a corporation of New Jersey
Filed Apr. 4, 1967, Ser. No. 628,341
U.S. Cl. 236—15                                 8 Claims
Int. Cl. F23n *1/00;* G05d *15/01, 23/22*

ABSTRACT OF THE DISCLOSURE

The temperature of an oven is measured by a temperature measuring thermocouple which transmits signals over a pair of leads to a controller which, in response thereto, controls the feeding of fuel to the oven. In order to prevent runaway of the system if the temperature measuring thermocouple opens, a signal generating thermocouple is connected across the pair of signal leads to the high gain amplifier section of the controller. The signal generated thereby will shut down the system in the absence of signals from the temperature measuring thermocouple.

---

This invention pertains to thermocouple monitored heat control systems and more particularly to such systems which include apparatus for protecting the system from runaway when the monitoring thermocouple circuit fails.

A common technique for controlling the temperature of an oven or furnace is to monitor its temperature with a thermocouple. The thermocouple is connected to a controller such as a potentiometer pyrometer controller. The controller controls the fuel fed to the oven or furnace in accordance with the signal representing the oven temperature that the controller receives from the thermocouple.

Since the controller is expected to respond to microvolt changes in the temperature measuring thermocouple whose maximum output voltage seldom exceeds 50 millivolts the controller must include high gain signal amplifiers.

The thermocouple is usually placed in or near the oven and the controller is placed remote therefrom with a pair of signal wires connecting the thermocouple to the controller. Since the thermocouple or even the signal wires are exposed to heat and corrosion open circuits occur. In such case, the controller loses control of the system; the system can run away. Because of the high gain of the controller amplifiers, any noise picked up by the signal wires affects the operation of the controller. Normally, this noise is shorted out or attenuated by the closed circuit which includes the measuring thermocouple.

Heretofore, attempts to solve the runaway problem contemplated the injection of a protective bucking signal into the controller. In particular, a voltage source in the form of an A-C source and rectifier combination or a low voltage (for example one volt) battery were shunted across the thermocouple-to-controller signal leads. This voltage source generated a D-C voltage which was so polarized as to drive the controller to shut down the system. Since this injected voltage would normally be present with the signal from the measuring thermocouple it had to be small enough not to swamp out the thermocouple signal. Accordingly, voltage dropping resistors having megohm values were connected in series with the voltage source. However, these megohm resistors are of high impedance. Therefore, they could not shut out or attenuate any noise picked up on the signal wires when the thermocouple opened. Furthermore, when a battery was employed it was necessary to periodically change the battery.

It is, an object of the invention to provide a protective voltage source for the above described system which does not have the shortcomings of the heretofore used sources.

Another object of the invention is to provide a low impedance protective voltage source for such systems so as to effectively attenuate noise signals picked up by the floating signal wires of an open thermocouple.

It is another object of the invention to provide a voltage source of the described class which will be durable, long lived, simple and inexpensive.

The invention contemplates a heat control system wherein a temperature measuring thermocouple senses the temperature of a region to be heated and feeds a signal over a pair of leads to a controller which is remote from the thermocouple. Fail-safe apparatus is provided for preventing temperature runaway if the temperature measuring thermocouple or the signal leads open circuit. The apparatus comprises a voltage generating thermocouple connected across the pair of signal leads of the high gain amplifier portion of the controller and means for heating the voltage generating thermocouple.

Other objects, the features and advantages of the invention will be apparent from the following detailed description of the invention when read with the accompanying drawing which shows, by way of example and not limitation, preferred apparatus for practicing the invention.

Figure 1:
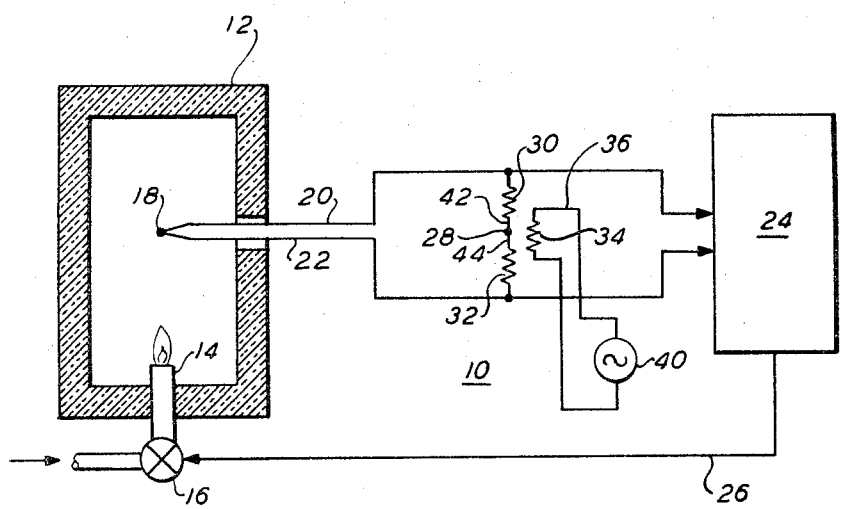
FIG. 1 shows schematically a controlled heating system in accordance with the invention.

Referring now to FIG. 1, a heat control system 10 is shown comprising an oven or furnace 12 heated by burner 14 which is fed fuel from solenoid operated valve 16. The temperature of the oven is monitored by temperature measuring thermocouple 18. Thermocouple 18 can be a bimetallic junction which generates a D-C voltage signal on leads 20 and 22 proportional to the temperature within the oven 12. The voltage is in the millivolt range. The resistance of the circuit including the pair of leads 20 and 22 and thermocouple 18 is in the range of 10 to 100 ohms.

Leads 20 and 22 are connected to the input terminals of oven controller 24, which may comprise high-gain signal amplifiers and a current amplifier which feeds current proportional to the amplitude of the input signal, via lead 26 to solenoid valve 16. Thus, the signal on leads 20 and 22 which are dependent on the temperature within oven 12 control the opening of valve 16. As the temperature within the oven 12 rises, valve 16 closes to lessen the quantity of fuel fed to burner 14; as the temperature of the oven drops valve 16 opens to increase the flow of fuel. Accordingly, the system is a closed loop servo system. Assuming the system is only as described, if the thermocouple 18 or leads 20 or 22 open, the signal received at the input terminals 24 will bear no relation to the temperature within oven 12. Furthermore, the input circuit to controller 24 (leads 20, 22), are susceptible of noise signal pickup. Even though the noise may be low level the high-gain amplifiers of the controller respond to this noise. These noise signals may cause the solenoid valve 16 to open further and the oven 12 to dangerously overheat. To prevent this a preventive voltage source comprising signal generating thermocouple 28 is connected via equivalued resistors 30 and 32 to leads 20 and 22, respectively. The thermocouple 28 may be heated by heating resistor 34, which is connected, via leads 36 and 38, to A-C source 40. It is possible to dispense with resistor 34 and source 40 by placing thermocouple 28 generates voltages in the millivolt range low as a thermionic vacuum tube or the like in controller 24.

Since thermocouple 28 generates a D-C voltage and if this voltage has a polarity which, when received by controller 24, causes it to close valve 16, then, if thermocouple 18 opens, the system will shut down. Since thermocouple 28 generates voltages in the millivolt range low value resistors 30 and 32, less than a kilohm, are required to attenuate the generated voltage to the desired value. Therefore, a low impedance shunt is always across leads 20 and 22 and any noise pickup by these leads when thermocouple 18 is open is effectively attenuated.

Figure 4:
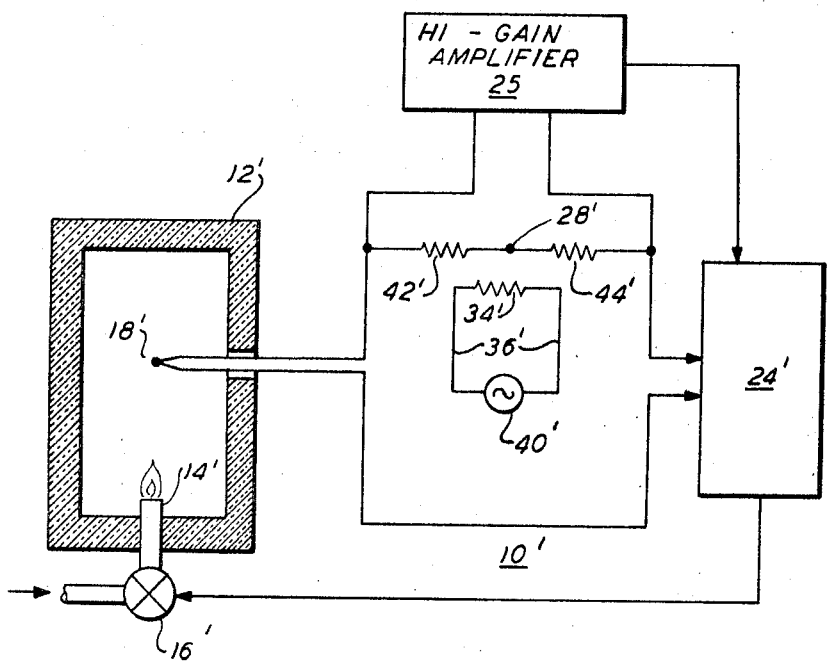
FIG. 4 shows schematically a variation of the system of FIG. 1.

While the system is designed primarily to provide fail-safe protection in the event of a defective sensing thermocouple or its leads, it is equally effective (FIG. 4), if an open circuit should occur in the internal circuitry of the controller. Since the systems are virtually the same, primed refreence characters are used for like elements, only the differences being mentioned. In particular, the controller 24 of FIG. 1 is shown divided into two portions in FIG. 4—the main controlling portion 24' and the high-gain amplifier 25 which receives the thermocouple voltages and feeds them to the controlling portion 24'. In FIG. 4, the voltage generating thermocouple 28' and its associated resistors are placed across the input terminals of the amplifier 25 while the sensing thermocouple 18' is connected across these terminals via the main controlling portion 24'. Thus if an open circuit develops in the internal circuitry of portion 24' there is no runaway since thermocouple 28' transmits signal to amplifier 25.

Figure 2:
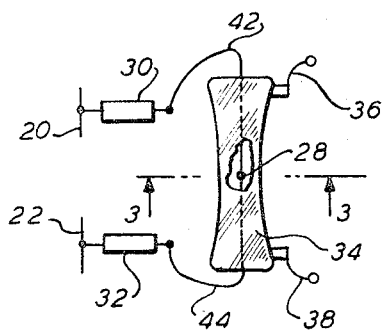
FIG. 2 is a plan view of the protective voltage source used in the system of FIGURE 1.
Figure 3:
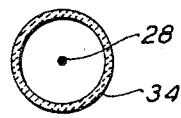
FIG. 3 is a sectional view of the heating resistor of FIGURE 2.

FIGS. 3 and 2 show an effective means for heating and protecting the thermocouple 28. In particular, heating resistor 34 (shown partially broken away) comprises a hollow tubular ceramic element around which is wrapped resistance wire. Thermocouple 28 is placed within the hollow tubular region with its leads 42 and 44 brought out and connected to resistors 30 and 32, respectively.

While the foregoing disclosure of exemplary embodiments is made in accordance with the Patent Statutes, it is to be understood that the invention is not limited thereto or thereby, the inventive scope being defined in the appended claims.

I claim:

1. In a heat control wherein a temperature measuring thermocouple senses the temperature of a region to be heated and the two signal leads of the thermocouple are connected to a controller which controls the feeding of fuel in accordance with the signal received from the temperature measuring thermocouple, fail-safe apparatus for preventing temperature runaway if the temperature measuring thermocouple or its associated signal leads open circuit, comprising a second thermocouple, low impedance means for connecting said second thermocouple across the two signal leads of the temperature measuring thermocouple adjacent the controller and means for heating said second thermocouple to produce a signal of sufficient amplitude to operate the controller to stop the feeding of fuel.

2. The system according to claim 1 wherein said low impedance means comprises voltage dropping resistor means.

3. The system according to claim 2 wherein one lead of said second thermocouple is connected to one of said signal leads by a resistor having a given value of resistance and the other lead of said signal leads by a resistor having said given value of resistance.

4. The system according to claim 1 wherein said heating means is a portion of the controller.

5. The system according to claim 1 wherein said heating means is a heat generating resistor and means for feeding electrical energy to said heat generating resistor.

6. The system according to claim 5 wherein said heat generating resistor comprises a hollow tubular core and electrical resistance means on the outer surface of said core, and said second thermocouple is disposed within said hollow tubular core.

7. The system according to claim 6 wherein said second thermocouple is connected to said two signal leads by voltage dropping resistor means.

8. The system according to claim 7 wherein one lead of said second thermocouple is connected to one of said signal leads by a resistor having a given value of resistance and the other lead of said second thermocouple is connected to the other of said signal leads by a resistor having said given value of resistance.

References Cited

UNITED STATES PATENTS

| | | | |
|---|---|---|---|
| 2,228,163 | 1/1941 | Cohen | 236—69 |
| 2,332,432 | 10/1943 | Busenkell | 236—69 X |
| 2,898,436 | 8/1959 | Lawler. | |
| 3,225,268 | 12/1965 | Metzadour | 236—78 X |

EDWARD J. MICHAEL, *Primary Examiner.*

U.S. Cl. X.R.

236—69